United States Patent [19]
Katsumata

[11] 3,732,483
[45] May 8, 1973

[54] MAGNET-TYPE AC GENERATOR FOR A BREAKERLESS-TYPE IGNITION SYSTEM

[75] Inventor: Mitsuo Katsumata, Numazu, Japan

[73] Assignee: Kokusan Denki Co., Ltd., Numazu, Japan

[22] Filed: Sept. 20, 1971

[21] Appl. No.: 182,076

[30] Foreign Application Priority Data

Sept. 21, 1970 Japan ..............................45/92857
Oct. 22, 1970 Japan ............................45/104267
June 14, 1971 Japan ..............................46/51018

[52] U.S. Cl. ..................322/91, 310/70, 315/209, 315/218
[51] Int. Cl. .............................................H02p 9/00
[58] Field of Search.....................310/70, 72, 153, 310/154; 322/91; 123/149; 315/208, 218

[56] References Cited

UNITED STATES PATENTS

| | | | |
|---|---|---|---|
| 3,619,634 | 11/1971 | Burson | 310/153 |
| 3,405,347 | 10/1968 | Swift | 328/91 |
| 3,626,273 | 12/1971 | Pfeffer | 322/91 |
| 3,398,353 | 8/1968 | Noddin | 322/91 |
| 3,484,677 | 12/1969 | Piteo | 322/91 |
| 3,037,148 | 5/1962 | Gayler | 310/70 |

*Primary Examiner*—R. Skudy
*Attorney*—Watson, Leavonworth & Kelton

[57] ABSTRACT

A magnet-type AC generator for a breakerless-type ignition system comprising a capacitor, an ignition coil including primary and secondary coils, a thyristor for discharging said capacitor through the primary coil of said ignition coil and a spark plug connected to the secondary coil of said ignition coil in which said generator comprises a stator including a capacitor charging winding or windings and a thyristor firing winding or windings, and a rotor including a multiple-pole magnetic field means which has a plurality of poles for cooperating with said capacitor charging and thyristor firing windings.

15 Claims, 23 Drawing Figures

MAGNET-TYPE AC GENERATOR FOR A BREAKERLESS-TYPE IGNITION SYSTEM

BACKGROUND OF THE INVENTION

This invention relates to magnet-type AC generators for breakerless-type ignition systems and more particularly, to magnet-type AC generators suitably employed in conjunction with capacitor discharge-type solid state ignition systems.

Generally, a capacitor discharge-type solid state ignition system comprises a thyristor for discharging a capacitor to the primary coil of an ignition coil. The gate of such a thyristor is fed with a firing signal after the capacitor has been charged to a predetermined voltage, but before the cylinder of an engine reaches the end of its compression stroke. Therefore, the thyristor requires a capacitor charging power source or main generator and a thyristor firing generator or pulser. A magnet-type AC generator is employed as such a capacitor charging power source. It is not desirable to fabricate the pulser as a separate unit and assemble the pulser to a main generator because of the fact that the resultant electric power generation apparatus may be a large size one. The magnet-type generator is usually employed for charging a battery as well as for charging a capacitor and when employed in an automobile, the generator is also employed for lighting. And the field system of the magnet-type AC generator usually has at least four poles so that the output of the main generator can be increased. Therefore, when a multi-pole generator has a pulser therein so that the pulser cooperates with the field system of the generator, each time the generator makes one complete revolution, since two or more firing signals are generated, an undesirable condition will be seen under which, in the ignition system associated with the generator, a spark strikes in a stroke or strokes of its cylinder other than the compression stroke of the cylinder.

Heretofore, there has been proposed a magnet-type AC generator in which a thyristor is so designed and disposed that only one signal is generated each time the generator makes one complete revolution. One example of such generators is shown and described in U.S. Pat. No. 3,358,665 issued to Thomas F. Carmichael et al. Dec. 19, 1967. In the generator of this U.S. patent, the rotor comprises a plurality of north and south poles and these north and south poles are usually alternately arranged, but one south pole may be substituted by one north pole and vice versa. Therefore, the magnetic field of the stator includes three adjacent north poles (or south poles). The firing winding comprises two coils which have the same number of turns and are differently connected to each other. In this type of generator shown in the U.S. patent, when the alternate poles of the rotor pass over the firing coils voltages having the same magnitude in the opposite directions are induced in the firing coils whereby the resultant composite voltage will be zero. However, when the three adjacent poles of the same polarity pass over the firing coils voltages having the opposite polarities are induced in the firing coils and composite voltages are developed.

However, the prior art generator of the above-mentioned U.S. patent is disadvantageous in that the three adjacent poles of the same polarity are not available for a winding or windings other than the firing winding. In the arrangement of the prior art generator of this U.S. patent, since a pulser comprising three adjacent poles of the same polarity and a firing winding is disposed within a main generator on the same plane, the resultant apparatus is inevitably a large size unit as seen in the case in which the pulser and main generator are separately fabricated and then assembled together. Furthermore, in the arrangement of the prior art generator of the U.S. patent, since there is provided in the circular direction of the rotor a magnetic field which is exclusively used for the pulser, but does not cooperate with a main winding or windings, the output or outputs of the main winding or windings are adversely affected and when such output or outputs are employed for directly driving a load such as a lamp the output or outputs cause the lamp to flicker.

SUMMARY OF THE INVENTION

Therefore, one object of the present invention is to provide a magnet-type AC generator of the above-type for an ignition system in which a pulser is internally provided thereby to construct such a generator in a small size.

Another object of the present invention is to provide a magnet-type AC generator for an ignition system in which a pulser is internally provided and a main winding or windings provided in the generator cooperate with the entire magnetic field whereby the output or outputs of said main winding or windings will not be adversely affected.

According to one aspect of the present invention there is provided a magnet-type AC generator for an ignition system or systems which comprise a capacitor, an ignition coil including primary and second coils, a thyristor for discharging said capacitor through said primary coil of the ignition coil and a spark plug connected to said secondary coil of the ignition coil, characterized in that said generator comprises a stator including a winding or windings for charging said capacitor and a thyristor firing winding or windings for feeding signals to the gate of said thyristor so as to turn the thyristor on, and a multi-pole rotor having magnetic field means including poles for cooperating with both said windings, poles of opposite polarities being alternately arranged in a circle and in which either said capacitor charging winding or said thyristor firing winding comprises two adjacent coils having the same number of turns and differentially connected to each other and said magnetic field means includes a magnetic field portion whereby said adjacent coils will lie at least once in magnetic paths having different gap lengths while said rotor is rotating.

The above-mentioned two adjacent coils are adapted to be in magnetic paths of the same gap length during a substantial portion of the rotation of the rotor and voltages of the same magnitude are respectively induced in the coils whereby the voltages are cancelled by each other and no voltage will develop in the coils. However, during a portion of the rotation of the rotor, since the coils are in magnetic paths having different gap lengths, voltages whose magnitude are substantially different are induced in the coils whereby a voltage having a magnitude corresponding to difference in the magnitudes of the induced voltages will appear across the ends of the coils differentially connected. When the coils constitute a signal winding, each time a generator or engine makes one complete revolution, one firing signal is obtained for turning-on the thyristor of the ignition system associated with the generator and the thyristor in turn discharges the capacitor which has been previously charged, through the primary coil of the ignition coil. On the other hand, when the coils constitute a capacitor charging winding, each time the generator or engine makes one complete revolution, the capacitor of the ignition system is charged once and a signal from the firing winding after the charging of the capacitor is fed to the gate of the thyristor to turn the thyristor on whereby the capacitor can be discharged through the primary coil of the ignition coil.

The above and other objects and attendant advantages of the present invention will be more readily apparent to those skilled in the art from a reading of the following description in conjunction with the accompanying drawings in which preferred embodiments of the invention are shown for illustration purpose only, but not for limiting the scope of the same in any way.

PREFERRED EMBODIMENTS OF THE INVENTION

Figures 1, 2, 3, 4, 5, 6:
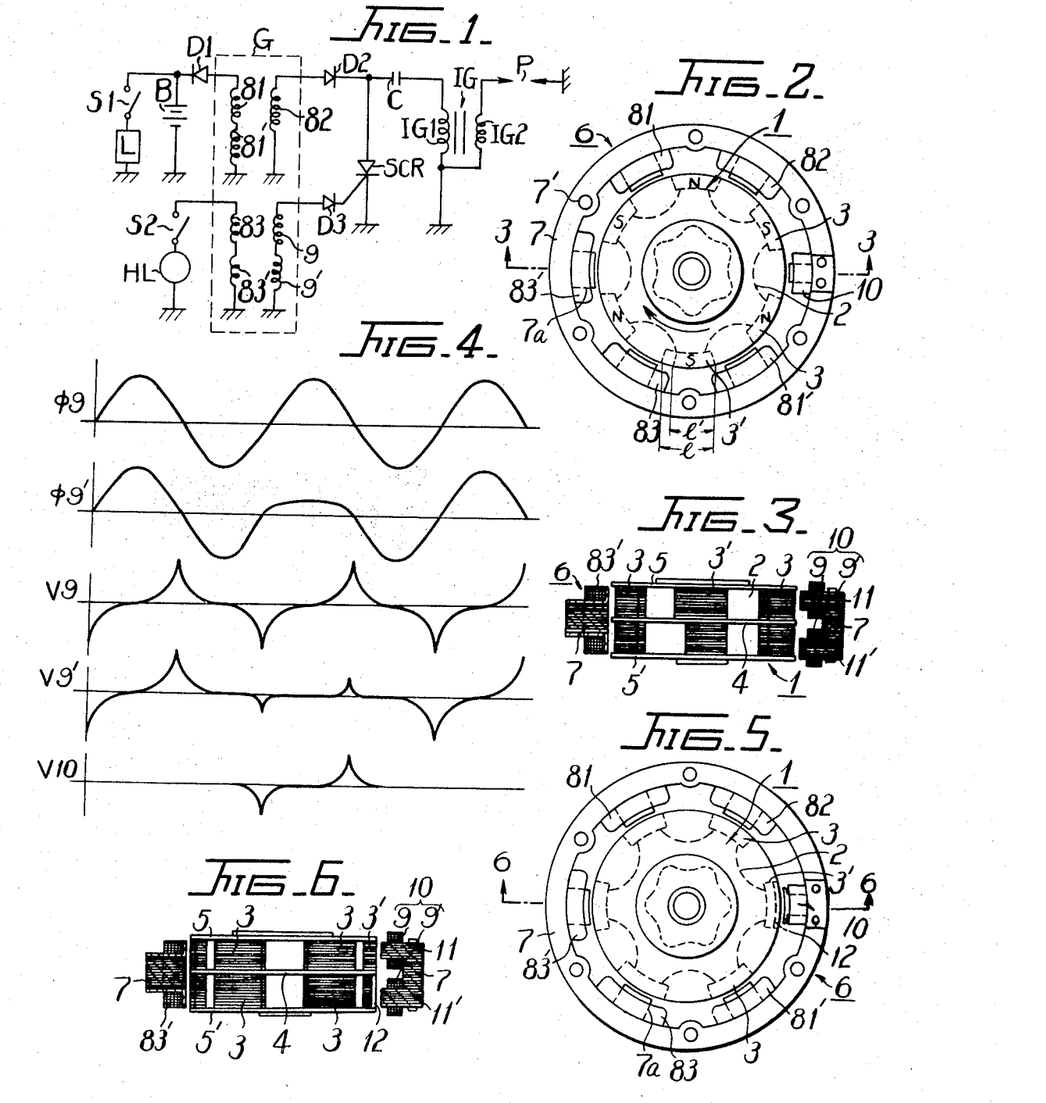
FIG. 1 is a schematic diagram of a circuit including a magnet-type AC generator, its associated breakerless-type ignition system and other loads.
FIG. 2 is a front elevational view of said generator of FIG. 1.
FIG. 3 is a side elevational view of said generator of FIG. 1 with the stator thereof in section taken substantialy along the line 3—3 of FIG. 2.
FIG. 4 is a wave form view showing magnetic fluxes to which signal generating coils for firing the thyristor of said generator of FIG. 2 are linked and voltages induced in said coils and resultant or composite output of the coils.
FIG. 5 is similar to FIG. 2, but shows an alternative AC generator of the invention.
FIG. 6 is a side elevational view of the generator of FIG. 5 with the stator thereof in section taken substantially along the line 6—6 of FIG. 5.

Referring to FIG. 1, there is schematically shown a breakerless-type ignition system having a magnet-type AC generator of the invention as its power source and other loads. The arrangement of the circuit shown in this figure is suitably employed in an automobile.

The AC generator generally comprises a winding consisting of coils 81 and 81' for charging a battery B, a capacitor-charging coil 82 of the ignition system, a winding 10 consisting of coils 9 and 9' for generating signals to fire a thyristor of the ignition system and a winding consisting of coils 83 and 83' for lighting.

One end of the winding consisting of the series-connected coils 81 and 81' is grounded whereas the other end thereof is connected through a diode D1 to the positive electrode of the battery B the negative electrode of which is grounded. The battery B is connected through a switch S1 to one end of loads L the other end of which is grounded. The loads L include electric loads of an automobile such as a horn, a traffic indicator, a wiper and the like.

One end of the winding consisting of the series-connected coils 83 and 83' is grounded whereas the other end thereof is connected through a switch S2 to a head lamp or lamps HL.

One end of the coil 82 is grounded whereas the other end thereof is connected to the anode of a diode D2, the cathode of which is connected to one end of a capacitor C. The other end of the capacitor C is connected to one end of the primary coil IG1 of an ignition coil IG the other end of which is grounded. The secondary coil IG2 of the ignition coil is connected to a spark plug P. Connected to the junction between the cathode of the diode D2 and the capacitor C is the anode of a thyristor SCR, the cathode of which is grounded. One end of the series-connected coils 9 and 9' is connected through a diode D3 to the gate of the thyristor SCR and the other end of the coils 9 and 9' is grounded.

A brief description will be had here on the operation of the ignition system referred to above. The output from the coil 82 is fed through the diode D2, the capacitor C and the primary coil IG1 of the ignition coil IG to the capacitor C. When voltage developed across the capacitor C has reached a predetermined value, a signal is generated at the series-connected signal coils 9 and 9' and the signal is fed to the gate of the thyristor SCR to turn the thyristor on. This discharges the capacitor C via the thyristor SCR and the primary coil IG1 of the ignition coil IG and a high voltage is induced in the secondary coil IG2 of the ignition coil IG to discharge the spark plug P. It will be understood that in order to attain a cycle of discharge at the spark plug P each time an engine makes one complete revolution, it is only necessary to charge the capacitor C or turn the thyristor SCR on only once per revolution of the engine.

FIGS. 2 and 3 show a magnet-type AC generator of the invention which is suitably employed in an arrangement in which the thyristor SCR is once turned on each time an engine makes one complete revolution and in this type of generator a rotor is disposed within a stator. The rotor 1 comprises a permanent magnet 2 having six poles and six pole pieces each mounted on each of the six poles of the magnet. The pole pieces comprise five identical pole pieces 3 and one particular shape pole piece 3'. All these pole pieces are of a laminated layer structure. A common reinforcing ring 4 extends horizontally through the pole pieces between the adjacent laminated layers in the center of the height of each pole piece to divide each pole piece into the upper lamination section and the lower lamination section. The ring 4 may be formed of either magnetic or non-magnetic material. The five laminated pole pieces 3 have the same outer arcuate length $l$ throughout the height. The upper lamination section of the particular one laminated pole piece 3' has the same outer arcuate length $l$, but the lower lamination section thereof has a shorter outer arcuate length $l'$. This means that the particular pole piece 3' is partially broken away in the lower lamination section. Non-magnetic side plates 5 and 5' are mounted on the axially opposite sides of the permanent magnet 2 and rivets (not shown) extend through one of the side plates, one of the divided lamination sections of each pole piece, the ring 4, the other lamination section of each pole piece and the other side plate to secure these parts together in a unitary assembly. The shaft of the engine (not shown) extends through a center hole in the rotor 1 to carry the rotor thereon.

The stator 6 comprises one annular laminated core 7, a winding 10 for generating signals for firing the thyristor and five main coils 81, 81', 82, 83 and 83' and the winding 10 includes two coils. The circle of the core 7 is circumferentially and equally divided into six sector portions five of which each has an inner tooth 7a. The above-mentioned five main coils are each disposed on each of the inner teeth 7a. As mentioned hereinabove, the coils 81 and 81' are adapted to form the winding for charging the battery B, the coil 82 is adapted to charge the capacitor and the coils 83 and 83' are adapted to form the winding for lighting the head lamp or lamps. The coils 81 and 81' are series connected to each other and similarly, the coils 83 and 83' are series connected to each other. The remaining one sector or the sector having no inner tooth thereon is provided on its axially opposite sides with notches in which the laminated core pieces or segments 11 and 11' are snugly fitted and the coils 9 and 9' are disposed on the core pieces. The coils 9 and 9' have the same number of turns and are differentially series connected to each other. It will be understood that the coil 9 cooperates with the upper half laminate sections of the pole pieces of the rotor whereas the coil 9' cooperates with the lower half laminate sections of the rotor pole pieces.

Although not shown, the layers of the laminated core 7 are secured together into a unitary assembly by rivets which extend through a series of angularly spaced holes 7' in the core and the laminated core is fixedly held within a casing (not shown) by means of suitable fasteners (not shown).

When the rotor 1 of the generator of the above-mentioned arrangement is rotated in the clockwise direction as shown by the arrow in FIG. 2, alternating magnetic fluxes link to the five main coils to induce voltages in the coils, respectively. Thus, the capacitor C is charged to a predetermined value with the output from the coil 82, the battery is charged with the output from the main coils 81 and 81' and the head lamp or lamps are caused to light with the output from the coils 83 and 83'. As the pole piece 3' passes over the five main coils, the waves of voltages induced in the coils are caused to slightly deform, but such deformation of the voltage waves will not adversely affect upon the operation of the lamp or lamps HL and the charging of the capacitor C.

When the five pole pieces 3 pass over the signal coils 9 and 9' in succession, voltages of opposite polarities are induced in the signal coils, respectively and therefore, the resultant or composite output from the signal coils will be zero. When the pole piece 3' passes over the signal coils 9 and 9', the magnetic fluxes to be linked to these coils will be unbalanced. To describe more particularly, since the upper laminated sections of the pole pieces 3 and 3' having the arcuate length $l$ always pass over the coil 9, a constantly varying magnetic flux passes through the coil, but the lower laminated pole sections of the five pole pieces 3 having the arcuate length $l$ and the lower laminated section of the pole piece 3' having the shorter arcuate length $l'$ pass over the coil 9', the gap length of the coil 9' relative to the lower laminated section of the coil 3' varies partially. The gap length varies to increase magnetic reluctance and accordingly, the magnitude of magnetic flux passing through the coil 9' is small. Therefore, when the particular one pole piece 3' passes over the coils 9 and 9', a higher voltage is induced in the coil 9 whereas a lower voltage is induced in the coil 9' whereby a resultant voltage develops across the winding 10. Referring to FIG. 4, there are shown magnetic fluxes $\phi 9$ and $\phi 9'$ to which the coils 9 and 9' link and voltages V9 and V9' induced in the coils each time the rotor 1 makes a complete revolution. As clear from this figure, while the pole piece 3' is passing over the coils 9 and 9' the magnetic flux $\phi 9$ which links to the coil 9 varies in the same manner as while the other pole pieces 3 are passing over the coils 91 and 91', but the magnetic flux $\phi 9'$ which links to the coil 9' varies by a lesser degree. Therefore, while the pole piece 3' is passing over the coils 9 and 9', voltage V9 is induced in the coil 9 whereas lower voltage V9' is induced in the coil 9' whereby voltage V10 (= V9 − V9') from the winding 10 will have the wave form as shown at the bottom of FIG. 4. When one positive half wave of the voltage V10 is fed to the thyristor SCR, as mentioned above, the thyristor is turned on and accordingly, the capacitor C which has been charged to a predetermined value up to this time is discharged through the thyristor and the primary coil of the ignition coil whereby the spark plug P is discharged. In this way, each time the engine (not shown) makes a complete revolution, one thyristor firing signal is generated to permit the breakerless-type ignition system to operate properly.

It should be noted that the main coils cooperate with the pole piece 3' associated with the pulser as well as the other pole pieces 3 to induce voltage in the coils and the thus induced voltage is subjected to only a negligible deformation. Thus, the operation of the head lamp or lamps HL is affected to only a substantially less extent thereby and the resultant output from the main coils can be made higher.

When it is desired to ignite two or more cylinders, a distributor may be connected to the secondary coil of the ignition coil and the number of rotations of the rotor per unit time may be increased by the number which is equal to the number of rotations of the rotor for one cylinder times the number of the cylinders employed. Alternatively, for the purpose, a combination comprising (a) ignition systems corresponding in number to that of cylinders employed and (b) a generator which includes a stator having the corresponding number of capacitor charging coils and pulser signal windings and a rotor quite identical with or substantially similar to the rotor shown in FIGS. 2 and 3. The signal coils are spaced from each other by an electrical angle in timed relationship to the ignition of the cylinders.

It should be understood that in a single cylinder arrangement, the coil 82 can be employed as the signal coil whereas the winding 10 can be employed as the capacitor charging winding. The reason is that in such an arrangement each time the engine makes one complete revolution it is possible to generate one capacitor charging output instead of generating one thyristor firing signal output. In an engine for a wide range of application such as agriculture and the like a coil or coils for head lamps or ther loads may be eliminated.

Referring to FIGS. 5 and 6, there is shown a modified rotor 1. The upper and lower laminated sections of the pole piece 3' have substantially the same outer arcuate length, but the outer surface of the lower laminated section is inwardly offset with to that of the upper laminated section. With such an arrangement of the two laminated sections of the pole piece 3', one of the laminated sections has a greater magnetic reluctance than the other section. Thus, when the pole piece 3' passes over the signal coils 9 and 9', resultant voltage V10 will develop in the coils in the same manner as mentioned in connection with the embodiment of FIGS. 2 and 3. In order to avoid unbalance in the rotation of the rotor 1 due to the inward offset of one of the laminated sections of the pole piece 3', it is preferably to provide a non-magnetic material 12 on the outer surface of the offset laminated section which has a configuration to compensate for such an offset.

Figures 7, 8, 9, 11:
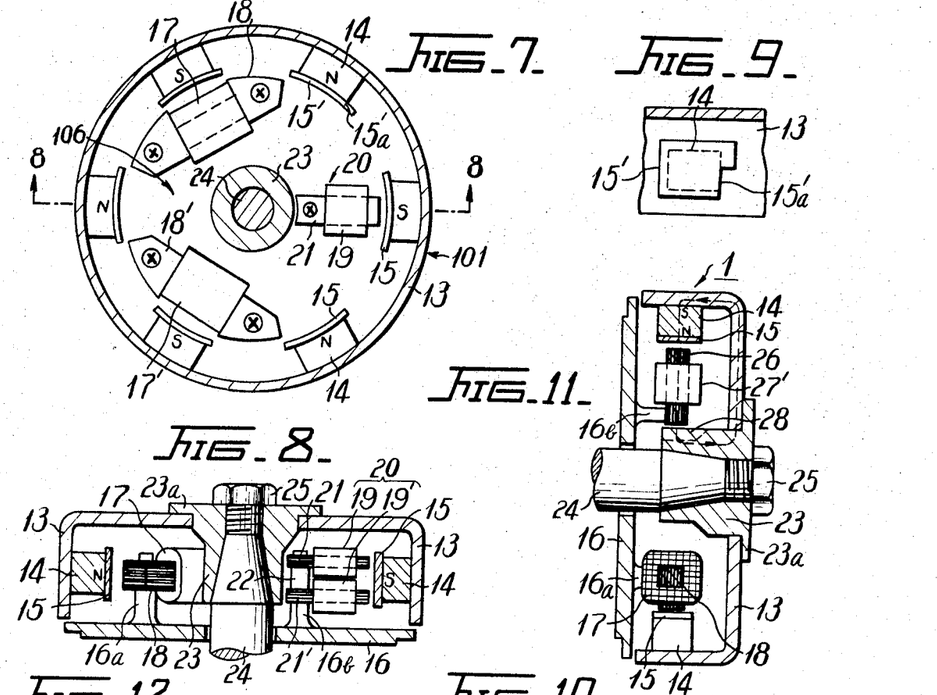
FIG. 7 is a cross-sectional view of another embodiment of AC generator of the invention employing a rotor in the form of a flywheel.
FIG. 8 is a cross-sectional view taken substantially along the line 8 — 8 of FIG. 7.
FIG. 9 is a fragmentary front elevational view of a deformed pole piece mounted in said flywheel of FIGS. 7 and 8.
FIG. 11 is a longitudinally section view taken substantially along the line 11 — 11 of FIG. 10.

FIGS. 7 and 8 show a flywheel-type AC generator embodying the present invention. In this embodiment, the rotor 101 of the generator comprises a cup-shaped flywheel 13 the inner peripheral surface of which is provided with six permanent magnets 14 in an equally angular spaced relationship. Five of the six magnets 14 are each respectively provided on their inner surfaces with one pole piece 15 and the remaining one magnet is provided on its inner peripheral surface with one particular pole piece 15'. These magnets and pole pieces are fixedly held in position with respect to the flywheel by screws (not shown) extending the magnets and pole pieces and screwed in the flywheel. The pole pieces 15 and 15' are formed of iron sheets. The particular one pole piece 15' is provided in the lower half portion at one end thereof with a notch 15'a (as seen in FIG. 9). Thus, magnetic reluctance in the pole piece 15' with respect to the stator is greater in the lower portion than in the upper portion as seen in the axial direction of the flywheel.

The stator 106 of the generator comprises a base plate 16 which is fixedly secured to a crank case (not shown) and mounted on the top of the base plate 16 are two main windings 17 and 17' spaced 120° from each other. These windings have laminated cores 18 wound thereon and these cores are secured to raised areas 16a of the base plate by means of screws extending the cores and threaded in the raised areas. The winding 17 is for charging the battery in the same manner as the winding comprising coils 81 and 81' does. Head lamps and other loads are connected to the battery. The winding 17' is for charging the capacitor of the ignition system in the same manner as the winding 82 in FIG. 1 does. A pulser winding 20 comprising two coils 19 and 19' is disposed on the base plate 16 with its axis extending in a radial direction of the base plate at a position 120° apart from the winding 17. The coils 19 and 19' are respectively wound on laminated cores 21 and 21', respectively and the core 21' is mounted on the base plate at the raised area 16b whereas the core 21 is mounted on the core 21' with a spacer 22 interposed therebetween. A screw extends through the core 21, spacer 22 and core 21' and is threaded at raised area 16b to secure the cores 21 and 21' to the base plate 16.

The flywheel 13 has a center opening through which a sleeve-like boss or rib 23 of magnetic material extends and has a flange 23a secured to the peripheral edge around the center opening by means of rivets. Alternatively, the rib may be integrally formed with the flywheel 13. The crank shaft 24 of an engine extends through the rib 23 and a nut 25 is threaded on one threaded end of the crank shaft to hold the flywheel in position on the crank shaft. One end of the cores 21 and 21' faces the rib 23 whereas the other end of the cores faces the pole piece 15 or 15' of the rotor. Therefore, while the rotor is rotating, since magnetic flux flows from one pole of each of the magnets 14 through the cores 21, 21', rib 23 and flywheel 13 to the other pole of the magnet 14, the magnetic flux is linked to the cores. And since the cores 21 and 21' are axially spaced from each other, it will be understood that as the pole piece 15' passes over the cores, the magnitude of flux flowing through the core 21 will vary in the same manner as when the flux flows from the other pole pieces 15, but the flux flowing through the core 21' is deformed in a different way from that in which the flux varies when the flux flows through the other pole pieces 15. The coils 19 and 19' have the same number of turns and are differentially connected to each other. Therefore, when the deformed flux flows through the core 21', resultant voltage is developed across the winding 20. This voltage is passed to the thyristor gate of FIG. 1 to turn the thyristor on whereby the charge of load on the capacitor C is discharged through the primary coil of the ignition coil.

Figure 10:
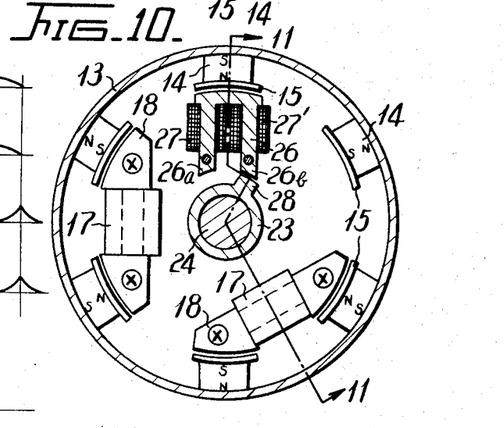
FIG. 10 is a cross-sectional view of an alternative AC generator shown in FIG. 7 in which a flywheel-type rotor and an induction-type pulser are employed.

Referring to FIGS. 10 and 11, there is shown a flywheel-type generator which comprises an induction-type pulser of the invention. This generator is substantially identical with the generator of FIGS. 7 and 8 except for the pulser. The pulser comprises a substantially U-shaped laminated core 26 as viewed in the axial direction of the flywheel and the coils 27 and 27' of a pulser winding are respectively wound on the two leg portions 26a and 26b of the core 26, respectively. In the arrangement as shown in FIGS. 10 and 11, the core 26 is mounted on the base plate 26 at the angle of 90° with respect to one power generation coil 17. The center axis of the core 26 is disposed in a radial direction of the flywheel 13 with the free ends of the leg portions facing the rib 23 whereas the base or connected ends of the leg portions facing the pole piece 15 so as to serve as a pole. The core 26 is secured to the base plate 16 at the raised area 16b thereof by means of screws. The six magnets 14 on the flywheel in this embodiment are respectively provided with identical pole pieces 15 with no notch as shown in FIG. 9. The outer peripheral surface of the rib 23 is substantially spaced from the opposite end faces of the leg portions of the core 26 so as to provide a large magnetic gap therebetween and the rib is provided with a projection or inductor 28 having a thickness facing to the end face of only one of the leg portions and the inductor is offset from the center of one of the magnets 14 in the direction of rotation of the flywheel. The coils 27 and 27' have the same number of turns and are differentially connected to each other. These coils provide firing signals to the gate of the thyristor of FIG. 1 in the same manner as the coils 19 and 19' of FIGS. 7 and 8 do.

Figure 12:
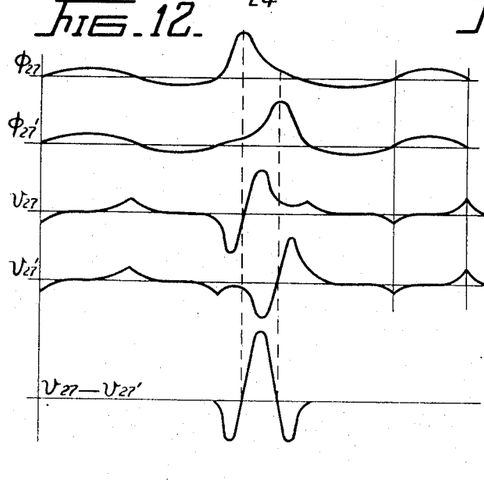
FIG. 12 is a wave form view showing magnetic fluxes to which signal generating coils of said generator of FIGS. 10 and 11 and voltages induced in said coils and composite output of the coils.

FIG. 12 shows wave forms of magnetic fluxes to which the coils 27 and 27' link and voltages induced in the coils 27 and 27'. While the flywheel 13 is rotating, when the inductor 28 moves away from the core 26, magnetic fluxes $\phi$ 27 and $\phi$ 27' having a relatively less variation flows from each magnet through the opposite leg portions of the core 26, rib 23 and flywheel 13 to be equally distributed through the leg portions, and accordingly, voltages V27 and V27' having the same magnitude, but in opposite directions are respectively induced in the coils 27 and 27', respectively and no output for the pulser winding is developed. Thereafter, the inductor 28 on the rib 23 passes over the core 26 and in passing over the core 26, the inductor 28 first passes over the the leg portion 26a and then the leg portion 26b. For this reason, great variation in magnetic fluxes occurs in the coils 27 and 27' in succession and accordingly, higher voltages 27 and 27' which are slightly out of phase to each other are developed in the coils 27 and 27' and the pulser output appears in the form as shown at the bottom of FIG. 12. This output is fed to the gate of the thyristor to turn the thyristor on.

Figures 13, 14, 15, 16:
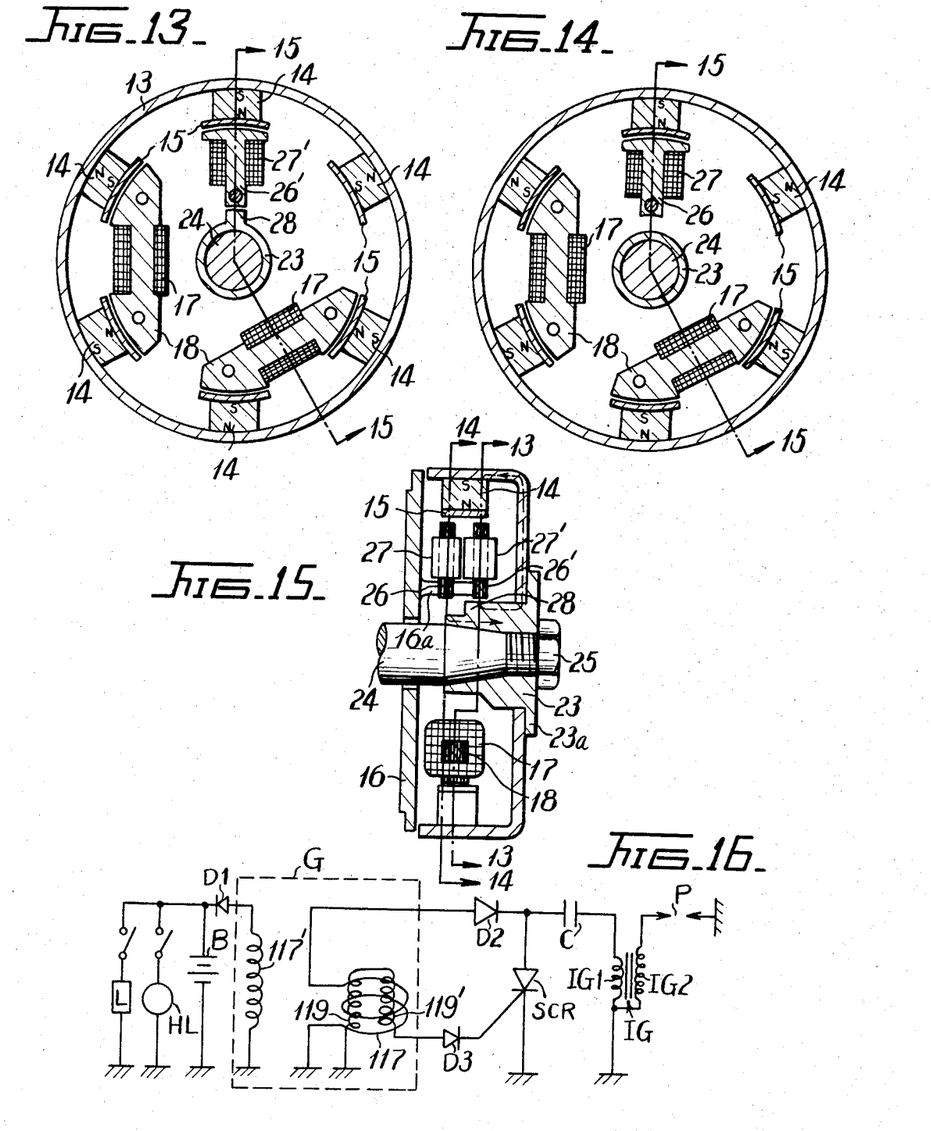
FIG. 13 is a cross-sectional view of a modification of said generator shown in FIGS. 10 and 11 taken substantially along the line 13 — 13 of FIG. 15.
FIG. 14 is a cross-sectional view of said generator of FIG. 13 taken substantially along the line 14 — 14 of FIG. 15 which is a plane different from the plane of FIG. 13.
FIG. 15 is a cross-sectional view taken substantially along the line 15 — 15 of FIGS. 13 and 14, respectively.
FIG. 16 is a schematic view of an electric circuit including a further embodiment of AC generator of the invention.

FIGS. 13 to 15 inclusive show a modification of the generator of FIGS. 10 and 11. In this modified arrangement, the coils 27 and 27' are wound on the legs of substantially T-shaped laminated cores 26 and 26' as viewed in the axial direction of the flywheel and these cores are mounted on the base plate 16 and arranged in the axial direction of the flywheel in the same manner as described in connection with the cores 21 and 21' of FIGS. 7 and 8. The inductor 28 has an axial length sufficient to face the end face of the leg portion of the core 26'. Thus, it will be understood that while the inductor 28 is passing over the core 26', high and different voltages are induced in the coils 27 and 27' and the composite output or pulser output is fed to the gate of the thyristor.

Referring to FIG. 16, there is shown an ignition system which is substantially similar to that of FIG. 1, but comprises a generator having a capacitor charging winding 117 around both signal windings 119 and 119'. The generator has another winding 117' which is for charging the battery B in the same manner as the winding 17' of FIGS. 7 and 8 does and a head lamp or lamps HL and other loads L are operated with the output of the battery.

Figures 17, 18, 19A, 19B, 19C, 19D, 20:
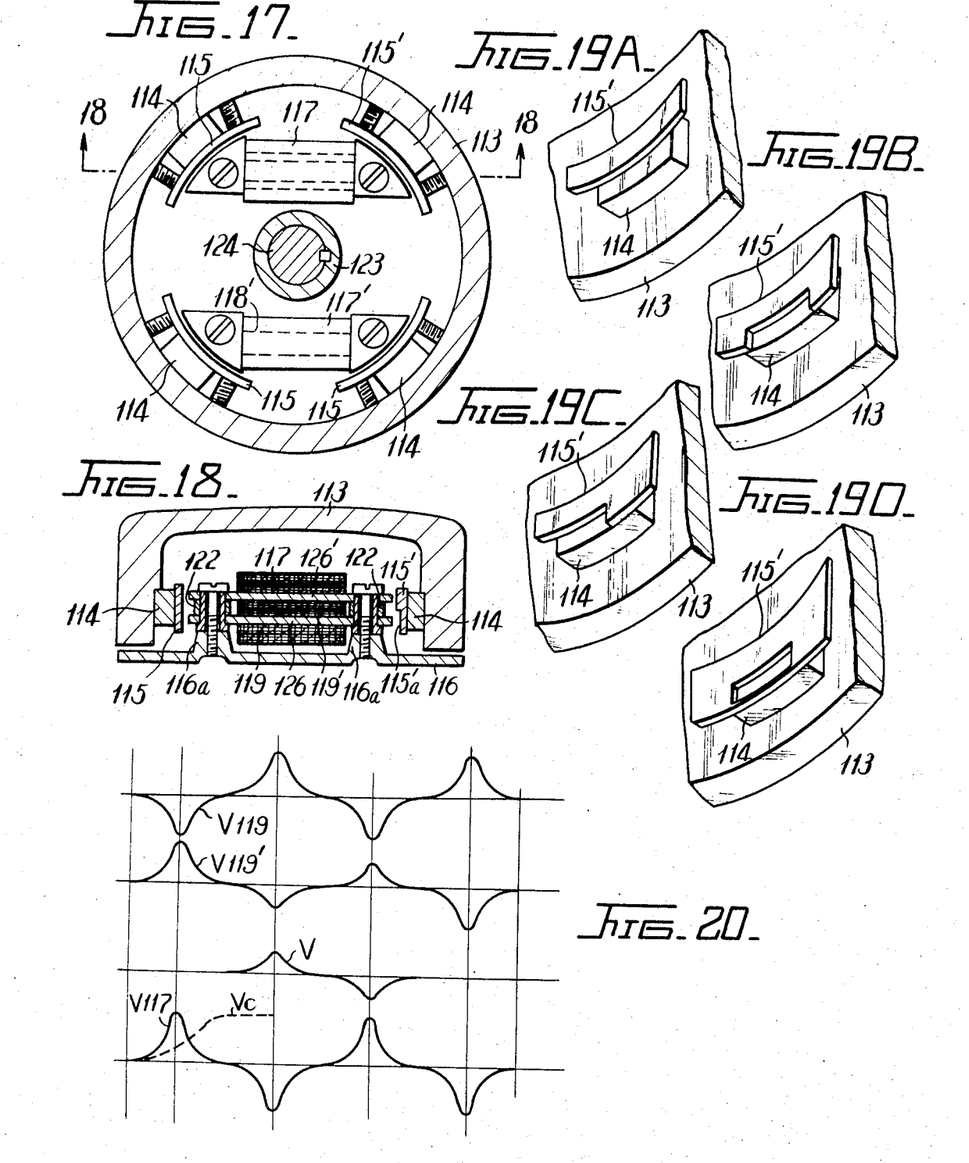
FIG. 17 is a cross-sectional view of said AC generator of FIG. 16.
FIG. 18 is a cross-sectional view taken substantially along the line 18 — 18 of FIG. 17.
FIGS. 19A through 19D are fragmentary views showing other modifications of one deformed pole piece of said generator shown in FIGS. 17 and 18, respectively.
FIG. 20 is a wave form view showing voltages induced in signal generating coils of said generator of FIGS. 17 and 18, composite voltage of the induced voltages, voltage induced in a capacitor-charging winding and voltage across said capacitor.

FIGS. 17 and 18 show details of the construction of a flywheel-type generator suitably employed in conjunction with the system of FIG. 16. The flywheel 113 comprises four permanent magnets 114, first pole pieces 115 respectively mounted on three of these magnets and a second pole piece 115' mounted on the remaining one magnet. The magnets and pole pieces are fixedly secured to the flywheel in a manner similar to that described hereinabove in connection with the preceding embodiments of the invention. As shown in FIG. 18, the particular one pole piece 115' has in the axial upper portion a thickness sufficient to provide a small gap between the poles of the stator and the one pole piece as in the case of the other pole pieces, but is cut away in the lower half portion at 115'a to provide a thinner thickness for forming a larger gap. The flywheel 113 is held in position by means of a crank shaft 124 extending through a rib 123 formed in the flywheel in a manner similar to that described hereinabove in connection with the preceding embodiments.

The particular pole piece 115' having the cut 115'a may be replaced by any of alternative pole pieces as shown in FIGS. 19A – 19D inclusive. The pole piece 115' of FIG. 19A is mounted on one half portion of the magnet 114 and the other half portion of the magnet is left exposed. The pole piece 115' of FIG. 19B is cut away in the center of its lower half portion. The pole piece 115' of FIG. 19C is cut away at one half area in the lower half portion and the pole piece 115' of FIG. 19D has an opening substantially in the center of the lower half portion. These alternative pole pieces have the same common feature in that they provide different magnetic gaps in their upper and lower half portions in the same manner as that of FIGS. 17 and 18.

The stator comprises two armatures. One of the armatures comprises a laminated core 118' and a coil 117' wound on the core and the core 118' is fixedly secured to a base plate 116 at its raised area by means of screws threaded into the raised area as in the case of the core 18' of FIG. 7. The other armature comprises two laminated cores 126 and 126' and signal generator coils 119 and 119' respectively wound on the cores. As in the case of the cores 21 and 21' of FIGS. 7 and 8, the cores 126 and 126' are fixedly secured to the base plate 116 at raised areas 116a thereof by means of screws. The cores 126 and 126' are spaced from each other in the axial direction of the flywheel by means of a spacer 122. A capacitor charging winding 117 is provided surrounding the two coils 119 and 119'.

The generator of FIGS. 17 and 18 is operated substantially in the same manner as the generator of FIGS. 2 and 3. To describe the operation of the generator of FIGS. 17 and 18, voltage as shown by V117 in FIG. 20 is induced in the winding 117 and the capacitor C is charged with this voltage as shown by Vc in FIG. 20. Voltages shown by V119 and V119' in FIG. 20 are respectively induced in the signal coils 119 and 119', respectively and resultant output of the signal coils is shown by V. The output signal V is then fed to the thyristor SCR to turn the thyristor on whereby the capacitor C is discharged. The advantage of this embodiment of generator is that since the cores 126 and 126' serve for both the signal coils 119 and 119' and capacitor charging winding 117, the generator can be constructed in a more smaller size and compact unit.

While several embodiments of the present invention have been shown and described in detail, it will be understood that the same are for illustration only and are not to be taken as a definition of the scope of the invention, reference being had for this purpose to the appended claims.

What is claimed is:

1. In a magnet-type AC generator for an ignition system which comprises a capacitor, an ignition coil including primary and secondary coils, gate-controlled solid state threshold switch means operative for discharging said capacitor through said ignition primary coil and a spark plug connected to said ignition secondary coil, said generator comprising a stator having a winding for charging said capacitor and a firing winding for feeding signals to the gate of said switch means for operation of said switch means, and a rotor having magnetic field means including circumferentially arranged poles cooperating with both said capacitor charging and firing windings, poles of opposite polarities being alternately arranged, said generator characterized further in that said firing winding comprises two adjacent coils having the same number of turns and differentially connected to each other and said magnetic field means includes a magnetic portion whereby, during each rotation of said rotor, said adjacent coils are disposed at one time in magnetic paths having respectively different gap lengths.

2. The magnet-type AC generator as set forth in claim 1, in which said magnetic field means comprises a permanent magnet having a plurality of pole pieces respectively mounted on said poles of the magnet and said magnetic field portion comprises one of said pole pieces, said one pole piece being provided with a notch or opening cooperating with one of said adjacent coils.

3. The magnet-type AC generator as set forth in claim 2, in which said two adjacent coils are arranged in the axial direction of said generator and said notch or opening is provided in one half section of said one pole piece in the axial direction of said generator.

4. The magnet-type AC generator as set forth in claim 2, in which said notch or opening in the one pole piece is filled with a non-magnetic balancing weight.

5. The magnet-type AC generator as set forth in claim 3, in which said notch or opening of the one pole piece is filled with a non-magnetic balancing weight.

6. The magnet-type AC generator as set forth in claim 1, in which said stator further includes a battery charging winding.

7. The magnet-type AC generator as set forth in claim 1, in which said magnetic field means of the rotor comprises a flywheel of magnetic material, a plurality of permanent magnets secured to said flywheel and pole pieces respectively mounted on said permanent magnets, and said magnetic field portion comprises one of said pole pieces, said one pole piece being provided with a notch or opening cooperating with one of said two adjacent coils.

8. The magnet-type AC generator as set forth in claim 7, in which said two adjacent coils are arranged in the axial direction of said generator and said notch or opening is provided in one half section of said one pole piece in the axial direction of said flywheel.

9. The magnet-type AC generator as set forth in claim 1, in which said magnetic field means of the rotor comprises a flywheel of magnetic material, a plurality of permanent magnets secured to said flywheel and pole pieces respectively mounted on said pole, and said flywheel has a sleeve-like magnetic boss or rib through which a rotary shaft extends to hold the flywheel in position, said two adjacent coils being disposed with their axes positioned in a radial direction of said flywheel and one end of the coils facing said rib.

10. The magnet-type AC generator as set forth in claim 9, in which said magnetic field portion comprises one of said pole pieces and said notch or opening is provided in the one pole piece cooperating with one of said two adjacent coils.

11. The magnet-type AC generator as set forth in claim 10, in which said two adjacent coils are arranged in the axial direction of said flywheel and said notch or opening is provided in one half section of said one pole piece in the axial direction of said flywheel.

12. The magnet-type AC generator as set forth in claim 9, in which said magnetic field portion comprises said rib on the flywheel and the rib is provided with an inductor projecting therefrom so as to face one of said adjacent coils.

13. The magnet-type AC generator as set forth in claim 12, in which said two adjacent coils are arranged in the axial direction of said flywheel and said inductor is provided in one half section of said rib in the axial direction thereof.

14. The magnet-type AC generator as set forth in claim 12, in which said two adjacent coils are arranged in a common plane in the rotational direction of said rotor and said inductor is so provided on said rib that while said rotor is rotating the inductor faces said two adjacent coils in succession.

15. The magnet-type AC generator as set forth in claim 8, in which said capacitor charging winding is wound on said firing winding.

* * * * *